United States Patent [19]

Milne

[11] 3,764,992

[45] Oct. 9, 1973

[54] PROGRAM-VARIABLE CLOCK PULSE GENERATOR

[75] Inventor: David Crosby Milne, Long Valley, N.J.

[73] Assignee: Bell Telephone Laboratories, Incorporated, Murray Hill, N.J.

[22] Filed: Feb. 14, 1972

[21] Appl. No.: 225,733

[52] U.S. Cl. .................. 340/172.5, 331/49, 328/63, 328/207

[51] Int. Cl. .................. G06f 1/04

[58] Field of Search .................. 340/172.5; 328/34, 328/59–63, 129, 130, 152, 154, 207; 331/49

[56] References Cited

UNITED STATES PATENTS

| | | | |
|---|---|---|---|
| 3,226,648 | 12/1965 | Davidson | 328/63 |
| 3,214,695 | 10/1965 | Betz | 328/63 |
| 3,548,342 | 12/1970 | Maxey | 328/61 |
| 3,551,822 | 12/1970 | McNelis | 328/62 |
| 3,594,656 | 7/1971 | Tsukamoto | 328/63 |

OTHER PUBLICATIONS

L. L. Johnson et al., "Random Timing Generator," in IBM Tech. Discl. Bull., Vol. 12, No. 4, Sept. 1969, p. 614.

*Primary Examiner*—Paul J. Henon
*Assistant Examiner*—John P. Vandenburg
*Attorney*—W. L. Keefauver

[57] ABSTRACT

A binary coded character is decoded to enable one of a plurality of AND gates that are respectively actuated by outputs of different monostable multivibrators, each having a different predetermined reset delay time. The selected gate output is further delayed and then utilized to retrigger the multivibrators simultaneously and to initiate the supplying of a new character for decoding. The composite outputs of the selected gates comprise a train of pulses having a recurrence rate that varies in accordance with the information content of a succession of the aforementioned binary coded characters.

7 Claims, 3 Drawing Figures

PROGRAM-VARIABLE CLOCK PULSE GENERATOR

BACKGROUND OF THE INVENTION

1. Field of the Invention

This invention relates to a variable frequency pulse generator and particularly to such a generator in which the frequency can be rapidly varied without substantial transient effects.

2. Description of the Prior Art

It is known in data processors to improve the processor information throughput by changing the processor clock rate to run certain sequences of operations faster than others. Various techniques are employed to avoid spurious timing effects in the processor when the clock rate is changed. In some processors, operation is halted completely while a new clock rate is being selected; and, thus, the effects of selection transients are avoided. It is also known to utilize plural synchronously operating clock generators which produce pulse trains at rates which differ by some integral factor. In these cases special logic is often employed to signal when each instruction execution has been completed so that a new instruction may be called with an appropriate clock rate field for specifying an appropriate clock rate for that new instruction.

In microprogrammed data processing machines, sequencers supplying multiphase clock signals are generally not employed. These processors operate in accordance with instructions in a low-level program language which requires a single clock pulse for the execution of each instruction. Such processors still have the same problem of the need to improve information throughput because various operations utilize different numbers of levels of combinatorial logic. Each logic level adds a certain increment of delay. For example, one might compare the number of logic levels required for two different manipulative or Boolean logic operations in which at least two levels of logic are required for gating the appropriate argument signals into and out of the appropriate logic operation block. In the case of an AND gate, one additional logic level is required for the actual AND function; and, thus, a total of three levels are needed for the AND operation. By contrast, a combinatorial rotate function requires five shift levels of logic, for a 24-bit word, to make a total of seven logic levels that are necessary for the rotate operation. This is over a 100 percent increase in the number of logic levels as compared to the simple AND operation.

Generally, microprogrammed machines simply utilize a fixed clock rate wherein the clock period is of adequate length to assure completion of the longest instruction execution that can be called for. Although such a simple solution is wasteful of processor time, it does not require the microprogrammed machine to have built into each logic operation unit a circuit which can signal when an operation has been completed and the machine is ready for a new instruction which can call for a new clock pulse. The latter type of processor operation in which the initiation of each instruction is dependent upon the specific completion of a prior instruction is asynchronous operation and involves, in addition to the problem of building in the mentioned completion logic, certain maintenance difficulties in locating a faulty circuit in resuming operation in the midst of a program after a noise hit has caused a computation error.

The techniques heretofore employed in high level, sequenced processors for varying clock rate are not adaptable to the synchronous microprogrammed processor situation. The reason is that the synchronous microprogrammed machine may need a clock period change for each of plural successive instructions, and there has heretofore been no convenient synchronous mechanism for calling a new instruction from memory so that its clock rate field can indicate what clock period to use for executing the instruction. Furthermore, there has been no convenient way to select an individual clock period of a certain size without delay that would unduly reduce the processor use factor. This is particularly the case where some clock periods may differ by an interval which is substantially less than an integral multiple factor of clock period.

It is, therefore, one object of the present invention to improve variable frequency pulse generators.

It is another object to facilitate transfer between pulse repetition rates in data processor clock generators.

A further object is to reduce the possibility of producing spurious clocking effects in a data processing system wherein the clock rate is changed without stopping the data processor.

Still another object is to facilitate transfers between different clock pulse periods in a synchronous processor.

SUMMARY OF THE INVENTION

The foregoing objects are attained in an illustrative embodiment of the invention in which the duration of a pulse generator pulse repetition period is specified in a multibit electrical signal. Those bits are decoded and utilized to select one of a set of pulses, the generation of which had been simultaneously initiated but the appearance of which had been differently delayed. The selected pulse is then utilized for producing a new period specification signal and simultaneously initiating the generation of a new set of pulses.

It is one feature of the invention that circuits are provided for stopping operation of the pulse generator without truncating either a pulse or a pulse period.

It is another feature that the sequence of multibit signals defining different generator output rates is provided in a clock rate field of each of plural successive instructions which are read out of a control memory that supplies control signals to data processing apparatus which is clocked by the pulse generator output.

BRIEF DESCRIPTION OF THE DRAWING

A more complete understanding of the invention and its various features, objects, and advantages may be obtained from a consideration of the following detailed description in conjunction with the appended claims and the attached drawing in which:

DETAILED DESCRIPTION

Figure 1:
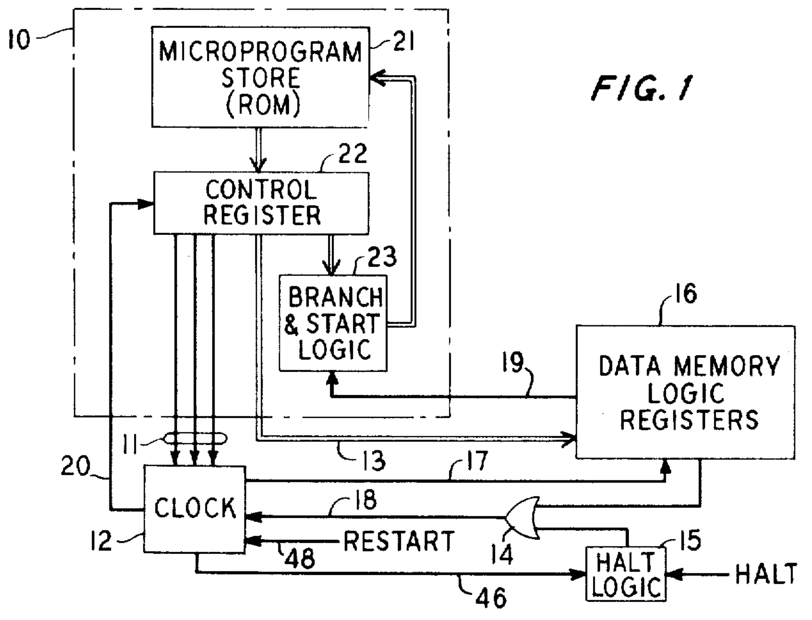
FIG. 1 is a simplified block and line diagram of a data processing system utilizing the present invention.

In FIG. 1 a control unit 10 supplies on circuits 11 binary coded character signals for defining the rate at which a clock 12 is to operate. Additional control signals are provided in the circuits of a bus 13 to data processing apparatus 16 which carries out the various arithmetic and manipulative logic functions directed by the control signals from the bus 13. The processing apparatus 16 receives clock signals on a circuit 17 from the clock 12, and provides data-operation-related control signals to the clock by way of an OR gate 14 on a circuit 18, and to the control unit 10 on a circuit 19. Clock 12 also provides clock signals to control unit 10 on a circuit 20. In addition, clock 12 provides on a circuit 46 to HALT logic 15 a signal for indicating that a new clock pulse is about to be produced. This signal allows logic 15, of any suitable type, to stop the clock without truncating a clock pulse.

The control unit 10 includes a microprogram store 21 that typically incorporates a read-only memory (ROM). A consideration of microprogramming and application thereof to several commercial machines can be found in the book *Microprogramming Principles and Practices* by S. S. Husson, Prentice-Hall, Inc., Englewood Cliffs, New Jersey, 1970. Control unit 10 also includes a control register 22 which acts as a buffer register for the read-only memory output. Each instruction provided from the store 21 to the register 22 includes in one field thereof the binary coded character defining the clock rate to be used for that instruction, and the bits of that character are applied by way of circuits 11 to the clock 12. Signal bits represented in other fields of each instruction in the register 22 are applied to the apparatus 16 by way of the bus 13. Any signal bits in a branching field of the instruction are applied to a branch and start logic circuit 23.

The logic circuit 23 includes circuitry which allows an instruction to call a subroutine which is stored at some specific read-only memory location so that it is not necessary to repeat the subroutine steps in the program each time that the subroutine is needed. This logic responds to the subroutine call to determine a return address that will be utilized on completion of the subroutine because the final instruction in each subroutine is one which refers the store 21 to a register (not separately shown) in logic 23 to obtain the next instruction address of the program. Logic 23 is also used to initiate execution of the main program after the processing apparatus memory and registers have been initialized.

Data processing apparatus 16 typically includes data memory, logic, and registers interrelated for performing various arithmetic and manipulative logic functions on data signals in accordance with the sequence of the program of instruction stored in control unit 10. One such operation is that of testing for certain data conditions and interrupting machine operation by stopping the clock 12 in response to a particular test result. For example, a fault or an error detection would indicate the need for such an interrupt pending correction. The apparatus 16 supplies that interrupt signal to clock 12 on the circuit 18. Similarly, the data result on a conditional transfer test is coupled from the apparatus 16 by way of the circuit 19 to the branch and start logic circuit 23.

In all of FIG. 1, registers are advantageously of the master-slave type. That is, each register is a double-rank type wherein the leading edge of a clock pulse allows the master register to store signals available at its inputs, and the trailing edge of the clock pulse causes the stored signals to be transferred to the slave register.

Figure 2:
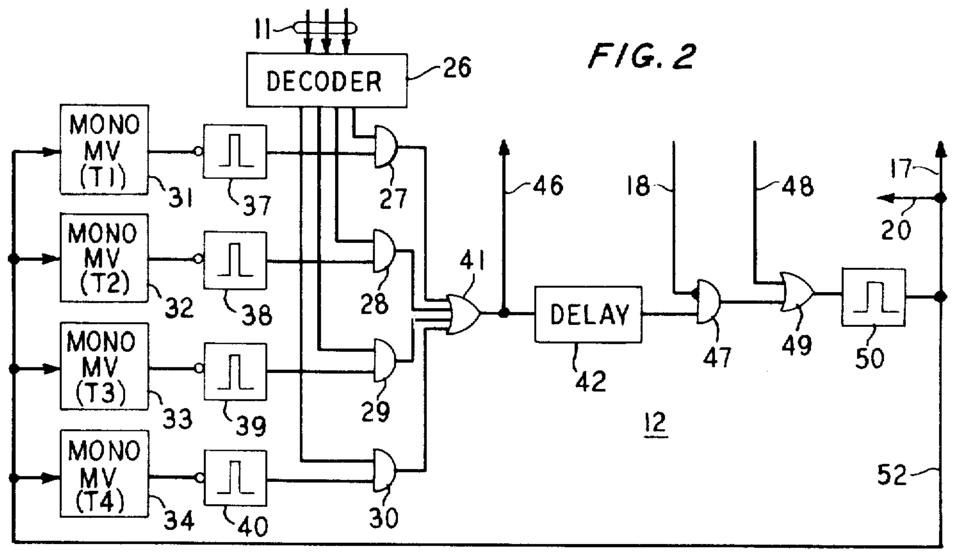
FIG. 2 is a schematic diagram of a clock pulse generator in accordance with the present invention.

In FIG. 2 there are shown the details of the pulse generator which comprises the central element of the clock 12. In this pulse generator the clock rate determining signal bits on the circuits 11 from control register 22 in FIG. 1 are applied to a decoder 26. That decoder converts the binary coded pulse generator rate specification into a 1-out-of-*n* signal format for selecting a clock period duration out of *n* different clock period durations. In the illustrative embodiment of FIG. 2, $n=4$. The actual number of selectable clock periods utilized in any application of the pulse generator in FIG. 2 depends upon a designer's compromise between hardware costs on the one hand and the fineness of timing resolution desired on the other hand. In one processor designed for controlling a communication system switching office, four different clock periods were found to produce a satisfactory compromise which yielded about a 40 percent increase in processor throughput, as compared to the use of single fixed clock rate.

Each of the outputs of decoder 26 is applied as an enabling input connection for a different one of four AND gates 27, 28, 29, and 30. Only one of those gates is enabled at a time, and it remains enabled for as long as the corresponding instruction remains in the control register 22 of FIG. 1.

Four monostable multivibrators 31 through 34 of any suitable design are simultaneously triggered to initiate the generation of clock pulses. These multivibrators are advantageously of the retrigger type, i.e., if a new trigger pulse is applied to such a multivibrator while it is in its unstable state, the unstable time-out starts anew without allowing production of the trailing edge reset from the first triggering operation. Each such multivibrator has a different reset delay time T1 through T4, respectively, that elapses before such multivibrator resets to its stable condition after having been triggered to its unstable condition. Consequently, the trailing edges of the respective multivibrator pulses occur at different times even though the multivibrators are all simultaneously triggered.

Four pulse generators 37 through 40 of any suitable type are connected to be triggered by the trailing edges of the multivibrator output pulses respectively, as indicated schematically by the small circles signifying inverting inputs to the pulse generators. Each pulse generator produces the same output pulse configuration when triggered, and the resulting four pulse generator output pulses are applied for actuating different ones of the gates 27 through 30, respectively. These pulse generator outputs are advantageously caused to be sufficiently narrow so that they do not overlap the time interval when output signals of decoder 26 are changing in response to the insertion of a new instruction into register 22.

As previously noted, only the single, enabled, one of the gates 27 through 30 can actually be operated by the output from its corresponding pulse generator; and the output of that single operated gate is coupled through an OR gate 41 to an input connection of a delay circuit 42. The amount of delay provided by the circuit 42 is fixed, in accordance with the nature of any logic, not shown in detail, either in the processing apparatus 16 or external to the machine, that is used to halt the clock. For example, delay 42 must allow sufficient time after a pulse is applied to circuit 46, and before the pulse exits from delay circuit 42, for an external halt signal to be generated in logic 15 and coupled through OR gate 14 and circuit 18 in FIG. 1 to the inhibiting input connection of an AND gate 47 in FIG. 2 to block the delayed pulse from circuit 42. Similarly, the apparatus 16 has the capability of generating an interrupt signal that is ORed onto circuit 18 for the same purpose, and delay circuit 42 must allow sufficient time after a first pulse from generator 50 for a possible interrupt signal to be operative on a succeeding pulse in the clock.

If gate 47 is inhibited to prevent the application of a single pulse from the pulse generator to processing apparatus 16, to control unit 10, and to circuits for retriggering the multivibrators, as will be described, the operation of the entire processor is halted. An external input must be provided to restart the operation. Such an external input is supplied on a circuit 48 from any suitable source (not shown). For example, an attendant may simply depress a button to apply the appropriate logic level voltage momentarily to the circuit 48 for simulating a pulse, or such a voltage may also be applied from some associated equipment. The restart signal for circuit 48 and the normal uninhibited, operation signal from the output of gate 47 are ORed in a gate 49 and utilized to trigger a further pulse generator 50.

The generator 50 produces a pulse of correct size and duration to operate the various processor circuits with adequate margins. Such a pulse in the output of generator 50 is applied to the circuit 17 for supplying clock signals to the processing apparatus 16 and to the circuit 20 for supplying clock signals to control unit 10. The output of generator 50 is also applied on a circuit 52 for retriggering the multivibrators 31 through 34. This retriggering of the multivibrators generates a new set of pulses from which the new instruction, which is called up in control unit 10 by the same clock pulse which accomplished the retriggering, makes a selection so that clock 12 provides a clock period which is appropriate to the execution of the new instruction.

It can be understood from the foregoing description of FIG. 2 that clock period selection is effected between outputs of pulse generators 37–40 and inputs to OR gate 41. Similarly, in a time sense, the selection is effected after each simultaneous retriggering of the monostable multivibrators and before any pulse generator associated with those monostable multivibrators can produce a corresponding output pulse. Thus, every clock pulse period conforms to one of the predetermined selectable periods, and there can never be a different, truncated or elongated, transitional clock interval. This feature is illustrated with the aid of FIG. 3.

Figure 3:
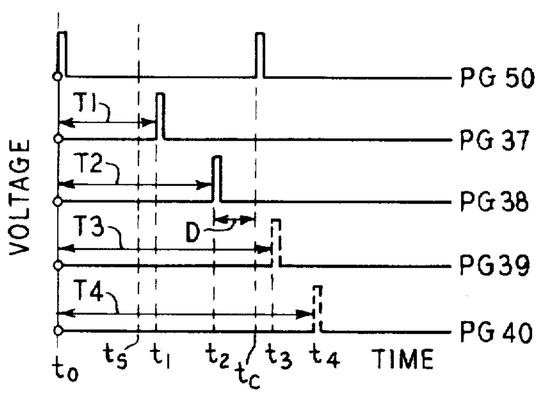
FIG. 3 is a family of timing diagrams illustrating the operation of the generator of FIG. 2.

FIG. 3 is a timing diagram showing outputs of pulse generators 37—40 and 50 for an illustrative clock period selection. At a time $t_0$ a first pulse from generator 50 triggers all of the multivibrators 31–34 simultaneously; and, subsequently, their associated pulse generators 37–40 can produce the illustrated pulses at times $t_1$–$t_4$, respectively. A clock period selection is effected by the output of decoder 26 at a time $t_s$ which occurs before any pulse generator output can appear. This selection allows one pulse generator output, e.g., that of generator 38 at time $t_2$, to pass through to generator 50 where a new retriggering clock pulse is produced, e.g., at time $t_c$. The time $t_c$ occurs before either of the generators 39 and 40 have operated in the case where the delay D between the output of the selected one of the generators 37–40 and the output of generator 50 is less than the smallest difference among the multivibrator reset times T1, T2, T3, and T4. Consequently, for the FIG. 3 illustration, the outputs of generators 39 and 40 are shown in broken-line form. In the case of a delay D larger than that difference, the outputs of generators 39 and 40 are simply ignored because their associated gates 29 and 30 are not enabled. The new pulse from generator 50 initiates a new clock cycle of selectable duration in the manner just described. For the new cycle, the time $t_0$ occurs at the time $t_c$ in FIG. 3. Thus, there is complete freedom of period selection without a transitional truncated or lengthened clock period.

In the aforementioned pulse generator, which was designed for a communication switching system processor, the approximate clock period sizes were:

| Multivibrator Reset Delay Time | Total Clock Period (in nanoseconds) |
|---|---|
| T1 | 300 |
| T2 | 370 |
| T3 | 430 |
| T4 | 475 |

For the system program employed in that processor, these periods resulted in a weighted average period of 330 nanoseconds. That average period corresponds, for the same program, to an increase in the average clock rate, i.e., the rate of microprogram instruction processing, of approximately 40 percent.

The pulse generator of clock 12 is relatively easily enlarged to add more periods of different sizes to those periods that are already available. It is necessary to add for each new period only a monostable multivibrator, a pulse generator, and a coincidence gate between the circuit 52 and the input to gate 41 in a path similar to those already available. Also, an individual selectable clock period size can be adjusted readily by simply varying the time constant of the multivibrator producing the period-determining pulse.

Although the present invention has been described in connection with a particular application thereof, it is to be understood that additional modifications, applications, and embodiments which will be apparent to those skilled in the art are included within the spirit and scope of the invention.

What is claimed is:

1. In combination, means, responsive to an initiating signal, for generating a set of pulses having leading edges occurring at different predetermined times, an output connection, means for coupling a selectable one pulse of said set of pulses to said output connection, and means for applying said one pulse at said output connection to said generating means as said initiating signal for initiating the generation of a new set of said pulses.

2. The combination in accordance with claim 1 in which said coupling means comprises means for producing a succession of selection signals specifying said one pulse of each set of pulses for coupling to said output connection, gating means, responsive to said selection signals, for selecting said one pulse, and means for applying a pulse at said output connection to actuate said producing means to produce a new selection signal.

3. The combination in accordance with claim 1 in which said generating means comprises a plurality of monostable multivibrators having different reset delay times, means responsive to said applying means for simultaneously triggering all of said multivibrators to their unstable set state, and plural pulse generators, each responsive to the resetting of a different one of said monostable multivibrators to its stable state for producing a pulse of a predetermined standard configuration, said standard pulses resulting from one simultaneous triggering of said multivibrators comprising one of said sets of pulses.

4. The combination in accordance with claim 1 in which said coupling means comprises means for selecting a pulse from each set of said pulses, means, responsive to a pulse selected by said selecting means, for controllably inhibiting operation of said generating means, and means for delaying by a predetermined interval the coupling of selected pulses to said inhibiting means, said interval being sufficient to allow operation of said controllable inhibiting means.

5. The combination in accordance with claim 1 in which said coupling means comprises data processing means for making predetermined tests, each producing one of at least two different test result signals, means for clocking said processing means by pulses in said output connection, means responsive to a predetermined result signal from said processing means for inhibiting the coupling of pulses to said output connection, and means for restarting the coupling of pulses to said output connection.

6. The combination in accordance with claim 5 in which a delay circuit is coupled between said generating means and said inhibiting means, and said delay circuit subjects signals transmitted therethrough to a sufficient delay to allow completion of said test in response to a first output connection pulse before a newly selected generating means pulse reaches said inhibiting means.

7. The combination in accordance with claim 2 in which said coupling means further comprises means for controllably inhibiting the coupling of said one pulse to said output connection and thereby inhibiting operation of said generating means, and means for delaying by a predetermined interval the coupling of said one pulse to said inhibiting means, said interval being sufficient to allow operation of said controllable inhibiting means.

* * * * *